United States Patent [19]

Iseard

[11] Patent Number: 4,522,896
[45] Date of Patent: Jun. 11, 1985

[54] AUTOMATIC WATERING SYSTEM FOR BATTERIES AND FUEL CELLS

[75] Inventor: Barry S. Iseard, Freeport, The Bahamas

[73] Assignee: Anglo-American Research Ltd., Freeport, The Bahamas

[21] Appl. No.: 478,091

[22] Filed: Mar. 23, 1983

[51] Int. Cl.³ .......................................... H01M 2/36
[52] U.S. Cl. ...................................... 429/63; 429/78
[58] Field of Search ...................... 429/63, 77, 78, 88, 429/72, 67

[56] References Cited

U.S. PATENT DOCUMENTS

| | | | |
|---|---|---|---|
| 925,708 | 6/1909 | Lake | 429/71 |
| 1,198,419 | 9/1916 | Clark | 429/71 |
| 1,206,850 | 12/1916 | Hubbard | 429/71 |
| 1,302,648 | 5/1919 | Flanders | |
| 1,349,297 | 8/1920 | Startakoff | 429/64 |
| 1,383,411 | 7/1921 | Longstreet | 137/21 |
| 1,471,048 | 10/1923 | Menger | 137/21 |
| 1,587,147 | 6/1926 | Clark | 429/71 |
| 1,878,223 | 9/1932 | Woodbridge | 429/78 |
| 1,996,843 | 4/1935 | Meter | 429/78 |
| 2,135,158 | 11/1938 | Wolford | 137/21 |
| 2,140,432 | 12/1938 | Nomiya | 137/21 |
| 2,209,788 | 7/1940 | Mosher | 137/68 |
| 2,252,026 | 8/1941 | Oettinger | 137/21 |
| 2,273,244 | 2/1942 | Ambruster | 429/71 |
| 2,339,642 | 1/1944 | Gro et al. | 136/162 |
| 2,543,724 | 2/1951 | Iwanowski | 136/162 |
| 3,040,116 | 6/1962 | Gauvin | 114/211 |
| 3,189,063 | 6/1965 | Lowe | 141/199 |
| 3,434,887 | 12/1966 | Seckinger | 136/162 |
| 3,510,360 | 5/1970 | Steiner | 136/162 |
| 3,664,876 | 5/1972 | Carl | 136/160 |
| 4,066,825 | 1/1978 | Eberle | 429/71 |
| 4,087,592 | 5/1978 | Okazaki et al. | 429/63 |
| 4,276,357 | 6/1981 | Ferrarini | 429/63 |
| 4,286,027 | 8/1981 | Shropshire et al. | 429/18 |

FOREIGN PATENT DOCUMENTS

| | | | |
|---|---|---|---|
| 2303244 | 7/1974 | Fed. Rep. of Germany | |
| 736404 | 9/1932 | France | 429/78 |
| 1435071 | 5/1976 | United Kingdom | 429/63 |
| 1509683 | 5/1978 | United Kingdom | |

OTHER PUBLICATIONS

"Electric Delivery Van", by M. L. Whitehead, Paper 790162, Congress and Exhibition, Cobo Hall, Detroit, Feb. 1979.
"Battery for Electric Vehicle", J. Mandil, Fourth Int'l Electric Vehicle Symposium, Aug. 1976.
Tudor CVF Datum Central Water Filing System for Standard Industrial Batteries.
Exide Corp. Single Point Watering.
"West Germany Varta Electric Vehicle Tests, by M. W. Peters, Paper #790160, Congress and Exhibition, Cobo Hall, Detroit, Feb. 1979.

Primary Examiner—Donald L. Walton
Attorney, Agent, or Firm—Cushman, Darby & Cushman

[57] ABSTRACT

An automatic watering and gas purging system for batteries and fuel cells utilizing a watering cap which establishes a desired electrolyte level in the cells.

3 Claims, 5 Drawing Figures

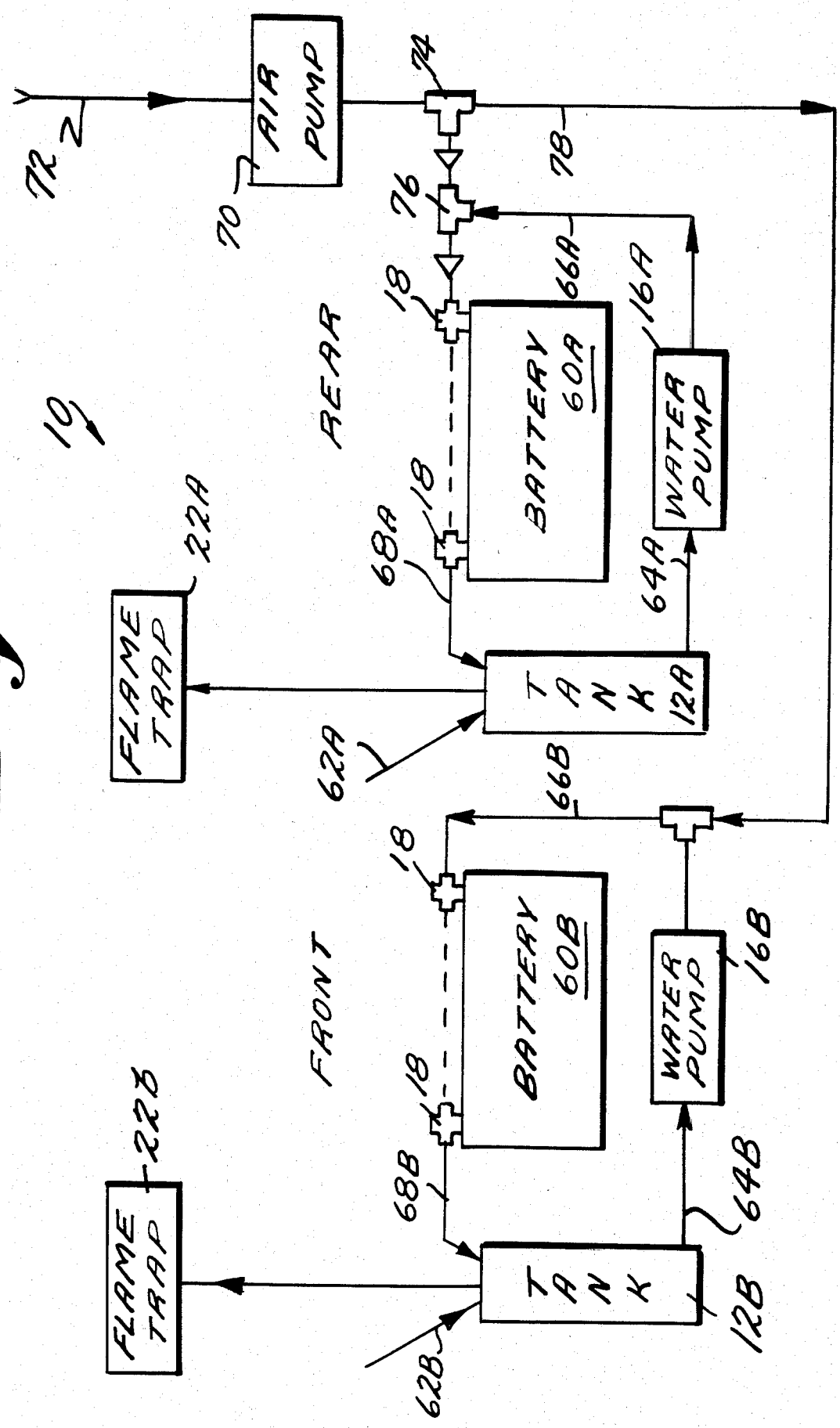

AUTOMATIC WATERING SYSTEM FOR BATTERIES AND FUEL CELLS

BACKGROUND OF THE INVENTION

The present invention relates to automatic watering systems for batteries and fuel cells, and, more particularly, to a combined gas purging and watering system for vented secondary batteries and fuel cells, and the watering caps used therein.

For various reasons, all secondary cells and fuel cells utilizing an aqueous electrolyte such as, for example, cells containing lead and lead oxide electrodes in a sulfuric acid electrolyte tend to undergo changes in volume of electrolyte during charge and discharge. For example, electrolyte loss often occurs during the charging process due to electrolysis (decomposition) of water in the electrolyte into its constituent elements, hydrogen and oxygen.

The gases generated by electrolysis during charging, when undiluted, form an explosive mixture. However, it is not desirable to completely eliminate such generation of gas. During the charging period, sulfuric acid is generated and tends to have an increased concentration adjacent to the portions of the electroplates where the majority of the electrochemical reaction occurs. Stratification of acid concentration can reduce the available discharge rate of the battery. A low level of gassing, providing slowly moving gas bubbles through the electrolyte, serves to distribute the generated sulfuric acid.

Loss of electrolyte also occurs due to evaporation, particularly in view of sustained periods of heat generation typically occurring during charging and high rate discharging of the battery, which often occur when a battery is used to power an electric vehicle. Such evaporation is particularly manifest in cells near the center of a large battery pack, due to heat entrapment.

If the level of electrolyte in a given battery cell drops below the tops of the electrode plates, irreparable damage to the plates can occur. Increased corrosion and shedding of active material tend to result, to the detriment of cell life and capacity. Moreover, there is an increased risk of arcing between exposed, and possibly faulty, plates, which could ignite any inflammable gases present. Conversely, the onset of higher temperatures often causes an initial expansion of the electrolyte in the cells. It is therefore necessary not only to allow for expansion of the electrolyte in the battery cells, and to vent and disperse explosive gas mixtures, but also to periodically add electrolyte to the cells to compensate for losses.

In general, automatic watering systems for replenishing electrolyte and purging gases are known. However, the prior art systems are disadvantageous in that they require special battery configurations, or require separate exhausting and electrolyte replenishing systems, or both.

Many such systems utilize battery covers which greatly restrict access to the contents of the cells. Other systems involve moving parts which are liable to malfunction.

Also, prior art watering systems often utilize a pump which is powered by an external source of power, typically line current. Thus, the watering systems can operate only when the vehicle is not being driven. In addition, such systems are typically manually operated, requiring an operator to deactivate the pump after pumping sufficient water to replenish the cells.

The removal of the explosive gases from the vicinity of the batteries in electric vehicles is usually effected by fans blowing air over the tops of the cells. Hydrogen is thus diluted to a concentration below 4%, (the recognized lower limit for spontaneously explosive mixtures of hydrogen and oxygen). However, pockets of explosive gas mixtures in the vicinity of the battery are sometimes difficult to detect and disperse. To this end, flame traps are often incorporated into automatic watering systems to prevent explosion or combustion from being propagated along pipes connecting watering caps when the vehicle is being driven. Examples of prior art systems are described in U.S. Pat. Nos. 1,302,648 issued on May 6, 1919 to Flanders; 3,434,887 issued on Mar. 25, 1969 to A. E. Seckinger; 3,664,876 issued to Carl on May 23, 1972; 4,087,592 issued May 2, 1978 to Okazaki et al; and 4,286,027 issued Aug. 25, 1981 to Shropshire et al. Another such system is described in Offenlegunschrift 2,303,244 by Tanaka et al, published July 25, 1974.

SUMMARY OF THE INVENTION

The present invention provides an automatic watering system for batteries and fuel cells, whereby the electrolyte level is replenished each time the battery is discharged, (either by an extrinsic power source, or during regenerative breaking) and whereby explosive gases generated during the later stages of lead acid battery charging are effectively diluted and removed (i.e. purged), vented through a flame trap remote from the battery pack(s) and other electrical components.

In accordance with one aspect of the present invention, novel watering caps, adapted for retrofitting on existing battery packs, are utilized to provide watering and gas purging for the individual cells. The respective individual caps are connected in series, or in parallel, suitably by flexible plastic tubing into an essentially closed system with one or more pumps, reservoirs and flame traps. Water and gas flow between successive cells is in the direction of electrical current flow. Groups of a predetermined number (e.g. 8) of serially connected cells, may be connected in parallel with respect to the water/air pathways, and joined by manifolds at the end of the series groups. Water and air flow is effected by the pumps and water reservoirs, and may be controlled manually or automatically through timers and relays incorporated into the battery charging system.

In accordance with one aspect of the present invention, a single pump is utilized to facilitate both watering and gas purging in applications having relatively low battery charge rates. Switching between the watering and gas purging functions is carried out by opening or closing a stop cock disposed between the pump and electrolyte reservoir.

BRIEF DESCRIPTION OF THE DRAWING

Preferred exemplary embodiments of the present invention will hereinafter be described in conjunction with the appended drawing wherein like numerals denote like elements and:

FIG. 4 shows a system in accordance with the present invention, adapted for use in an electric vehicle having high charge rate batteries disposed both in front and rear of the vehicle.

DETAILED DESCRIPTION OF THE PREFERRED EXEMPLARY EMBODIMENTS

Figure 1:
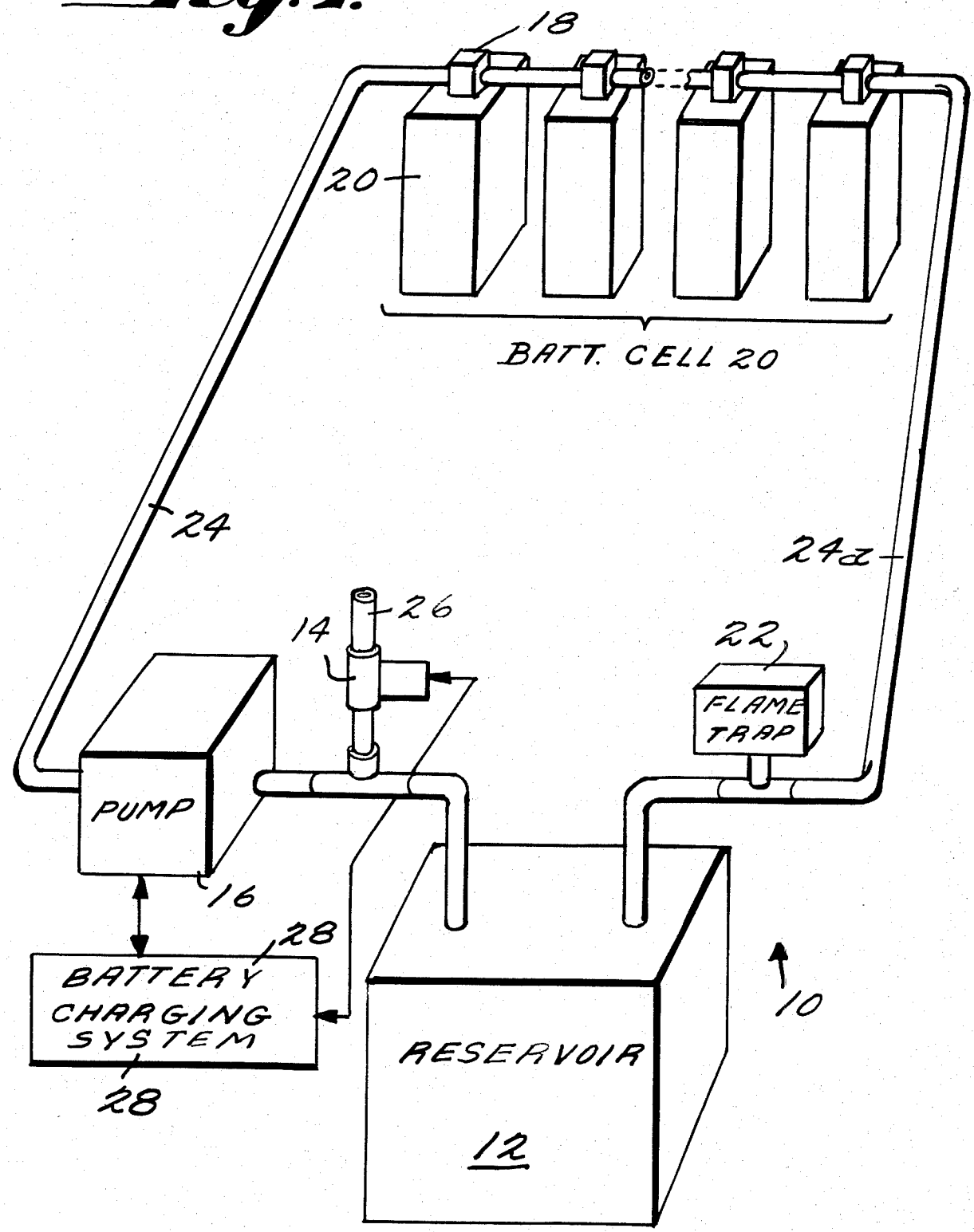
FIG. 1 is a pictorial block schematic of an automatic watering system in accordance with the present invention for use in low charge rate applications, showing relative elevational disposition.

Referring now to FIG. 1, there is shown an automatic watering system 10 in accordance with the present invention cooperating with a plurality of low charging rate battery cells 20. System 10 suitably comprises an electrolyte reservoir 12; a stop cock 14; a conventional pump 16, respective watering caps 18 and a conventional flame trap 22 all coupled by flexible interconnecting tubing 24 into an essentially closed system. As will be explained, stop cock 14 (cooperating with an associated air intake 26) and flame trap 22 selectively provide openings to the surroundings.

Figure 2A:
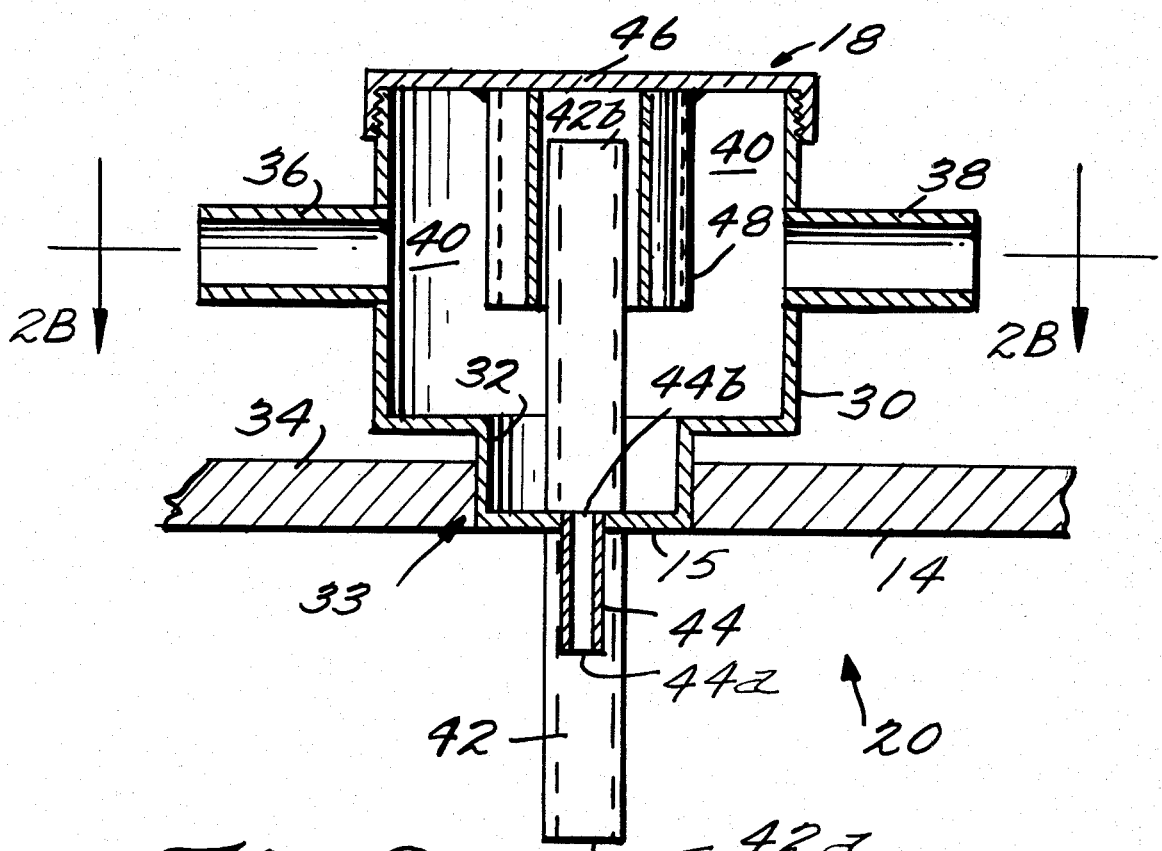
FIGS. 2a and 2b show sectional elevational and sectional top views, respectively, of a watering cap in accordance with the present invention.
Figure 2B:
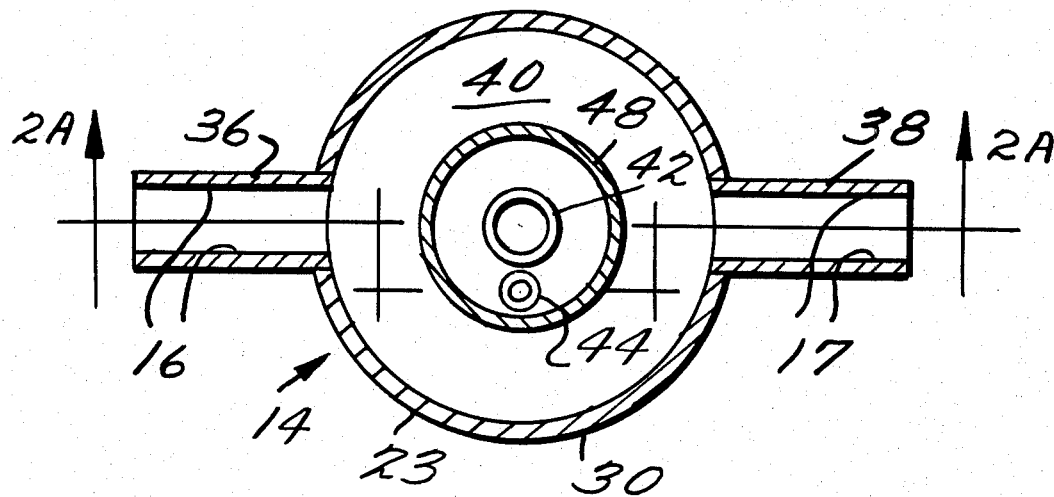

As will hereinafter be more fully discussed in conjunction with FIGS. 2a, 2b and 3, system 10 utilizes a respective watering cap 18, associated with each battery cell to be serviced by system 10. The respective caps 18 are connected in series (or into parallel group of serially connected caps) by tubing 24.

Pump 16, suitably a conventional diaphragm, peristaltic, or other low flow rate liquid/gas type pump, is disposed in the system between watering caps 18 and reservoir 12 to selectively pump liquid from reservoir 12 through the respective caps 18 in sequence, and then, through a return portion 24a of the interconnecting tubing back to reservoir 12.

Stop cock 14 is interposed to selectively provide an opening to the environment between pump 16 and reservoir 12. Stop cock 14 is suitably a conventional, manually operated, stop cock having one port coupled to a "t" coupling in interconnecting tubing 24 between pump 16 and reservoir 12. The other port of stop cock 14 is coupled to an air intake 26 disposed at an elevation higher than pump 16 and reservoir 12. As will be explained, reservoir 12 is disposed at a lower elevation than the remainder of the system. Flame trap 22 is disposed in the turn leg 24a of the interconnecting tubing at an elevation above caps 18 and reservoir 12 to provide for exhausting of gases and generate a reduced pressure in the return leg, as will be explained. Flame trap 22 is suitably formed of a porous ceramic or metallic material which does not permit propagation of a flame or explosion, but freely allows passage of air or electrolyte without a significant build up of pressure.

In general, system 10 provides both for a watering "operation", whereby electrolyte in cells 20 is replenished and gases in the cells displaced by the electrolyte are vented through flame trap 22, and a "gas purging" operation, whereby air is forced through interconnecting piping 24 to displace residual gases and water in the system. Excess water is returned to reservoir 12, and gases are purged from the system and exhausted through flame trap 22.

In the watering operation, pump 16 is actuated, and stop cock 14 is shut. It is assumed that reservoir 12 is initially substantially filled. Pump 16 is disposed so that it simultaneously draws fluid by suction from reservoir 12 and provides a positive pressure to push fluid through interconnecting tubing 24 to the first of the series of watering caps 18. Water is thus pumped into the battery system via interconnecting tubing 24 through each cap 18 in sequence, then through the return leg 24a back to reservoir 12. As will be explained in more detail in conjunction with FIGS. 2a and 2b, watering caps 18 establish a desired electrolyte level in cells 20, and provide a slow flow of water into cells 20 until the desired level is attained. Concommitantly, by replenishing the electrolyte level in cell 20, any gases in cell 20 are displaced and exhausted from the cell into cap 18. Such gases are, in large part, displaced by the flow of water through interconnecting tubing 24, and caps 18 in series until ultimately forced into return leg 24a and through flame trap 22. Displacement of gas by water in the cells with low electrolyte levels will continue until the desired electrolyte level is attained in all cells. Disposition of flame trap 22 in return leg 24a of the interconnecting tubing between cells 20 and reservoir 12, at an elevation higher than reservoir 12, permits exhausting the displaced gases therethrough, while at the same time excess water flow is directed back into reservoir 12. In addition, the exhausting of gas through flame trap 22 causes a reduction in pressure (as compared to ambient) in the return section 24a of the system. Pressure build-up in the watering caps is prevented to any significant extent, facilitating water flow and reliable operation of caps 18, as will be explained. To this end, it is also desirable to use a low current diaphragm pump to provide a low flow rate (e.g. 1 milliliter/minute to 100 milliliter/minute), and relatively wide bore interconnecting tubing and watering cap inlets and outlets (e.g. on the order of 0.3 inch to 0.5 inch internal diameter). Additional flame traps can be used, if desired, as appropriate.

The watering operation is suitably performed during periods when the battery is discharging. Any slight, instantaneous lowering of the electrolyte level due to, for example, electrolysis or evaporation results in an immediate topping up with water. Hence, at the termination of battery discharge, the electrolyte levels in each of the cells would be correct.

Shunt current losses due to accidental short circuits between the cells are minimized by coupling the water caps in a sequence corresponding to the electrical connections between the cells. Each of caps 18 in system 10 is coupled by tubing 24 to the cap of a cell which is directly electrically connected to the associated cell so that the difference in electromotor force (EMF) across any short circuit between the cells will be less than 1 cell EMF.

After the watering process, and during charging of the battery, the system can be purged of residual water and gases without interrupting operation of pump 16. Specifically, stop cock 14 is opened, effecting communication between interconnecting tubing 24 and the surrounding environment. The position of air intake 26 at an elevation above pump 16, reservoir 12, and the interconnecting tubing, prevents pump 16 from continuing to draw fluid from reservoir 12. Instead, pump 16 draws air through intake 26 and stop cock 14, which gradually displaces water and gases throughout the system. The displaced water is returned to reservoir 12 through the return leg 24a of the interconnecting tubing. Excess air and gases are vented through flame trap 22.

As previously noted, system 10 utilizes a particularly advantageous watering cap 18 associated with each cell 20. Referring now to FIGS. 2A and 2B, watering cap 18, will be described. Watering cap 18 is configured to cooperate with most conventional battery cell covers without requiring modification. Bayonet, screw, press, or other suitable holding mechanisms may be utilized, as appropriate. Watering cap 18 suitably comprises a body 30 having a base portion 32 adapted for cooperation with, e.g. configured to be received by in press fitting relation, the watering aperture 33 conventionally formed in the battery cover 34 of cell 20. The respective elements of battery cell 20 are omitted from the drawing for purposes of clarity.

Cap 18 includes a respective inlet 36 and outlet 38 communicating with an internal chamber 40. As will be explained, inlet 36 and outlet 38 are relatively wide bore (e.g. 0.3 inch to 0.4 inch internal diameter) and chamber 40 is of relatively wide diameter (e.g. on the order of 1.5 inches).

An air displacement tube 42 is fixed extending through the bottom of the cap base 32. Air displacement tube 42 is suitably centrally disposed in base 32. A lower portion of air displacement tube 42 extends outwardly of base 32 and terminates at a lower end 42a, has a length corresponding to a desired level of electrolyte in cell 20, as will be explained. An upper portion of air displacement tube 42, extends into chamber 40, terminating at a predetermined distance within the cell at end 42b. Air displacement tube 42 is of relatively wide bore (e.g. at least on the order of 0.25 inch inner diameter).

A watering conduit 44 also communicates between chamber 40 and the interior of cell 20. Watering conduit 44 is suitably a narrow tube having an interior diameter sufficiently small to create surface tension effects on water on the conduit, (e.g. on the order of 0.03 inch to 0.05 inch). Watering conduit 44 is suitably disposed in the bottom wall of base 32 radially offset from air displacement tube 42. An upper end 44b of the watering conduit 44 is suitably disposed at the level of the bottom wall of base 32, and a lower portion extends to a lower end 44a at a predetermined distance in the interior of cell 20.

Cap 18 also suitably includes a top portion 46 removably secured for example, by cooperating screw threads, in sealing relationship with body 30. Ready access to cell 20 can be provided by removal of watering cap 18 or by removal of top 46. A cylindrical baffle 48 depends from top 46, extending into interior chamber 40, to a level below upper end 42b of air displacement tube 42, inlet 36 and outlet 38. Cylindrical baffle 48 is suitably centrally disposed on top 46 and encompasses upper end 42b of air displacement tube 42.

Inlet 36 and outlet 38 cooperate with interconnecting tubing 24 (FIG. 1) to connect cap 18 into system 10. Tubing 24 couples the inlet 36 of cap 18 to pump 16 (or to the outlet 38 of the preceeding cap).

Outlet 38 is coupled by tubing 24 to the inlet 36 of the next successive cap (or through return leg 24a to reservoir 12). Water pumped through tubing 24 accesses chamber 40 through inlet 36, is accumulated in chamber 40. Air, or gas in chamber 40 (and the low pressure flow provided by pump 16) however, prevents the accumulated water in chamber 40 from reaching the level of the upper end of air displacement tube 42b. Cylindrical baffle 48 helps to prevent water from inlet 36 from entering air displacement tube upper end 42b. Baffle 48 tends to capture displaced air from cell 20, creating a small air lock within its interior. Thus, when the accumulated water in chamber 40 reaches the level of outlet 38, it exits through outlet 38 to tubing 24, for application to the next successive cap inlet or return leg 24a.

So long as the electrolyte level in cell 20 is below the lower end 42a of a displacement tube 42, gravity will cause water to flow from chamber 40 through watering conduit 44, into cell 20, displacing air and gases in cell 20. The displaced gases are exhausted through air displacement tube 42. Excess water passing through outlet 38 will carry the displaced gases (except those gases retained in the air lock in baffle 48 and the uppermost portion of chamber 40) into the next successive watering cap and ultimately into return leg 24a for venting through flame trap 22 FIG. 1). However, when the electrolyte level in cell 20 reaches the lower end 42a of air displacement tube 42, displacement of air through tube 42 is inhibited. Accordingly, if the bore of water in conduit 44 is sufficiently small, e.g. on the order of 0.03 inch to 0.05 inch, gravity will be insufficient to overcome to surface tension effects on the water, and the water will be retained in tube 44. Thus, under such circumstances, water in chamber 40 will not displace air in cell 20 in the absence of a significant pressure differential between the ends 44a and 44b of conduit 44.

Such a pressure differential is avoided, in accordance with the present invention by utilizing, for example, a low current diaphragm pump to provide a relatively low flow rate (e.g. 1 milliliter/minute to 100 milliliter/minute) in cooperation with relatively large diameter interconnecting tubing 24, inlet 36 and outlet 38 (e.g. 0.3 inch to 0.4 inch internal diameter). Thus, a low resistance to water flow is provided in caps 18, and essentially no pressure differential is generated between chamber 40 and cell 20. Thus, water flow through conduit 44 is effected essentially by gravity only. Further, the air lock created in baffle 48 creates a slight positive pressure inside cell 20 to counteract any slight positive pressure within chamber 40 due to the weight of the water.

It should be appreciated that fast flow rates of liquid in system 10 can create, through a Venturi effect, a drop in pressure at upper end 44b of water displacement conduit 44. If this occurred, air could be drawn out of cell 20 due to the Venturi effect causing a reduced pressure in cell 20 while water flowed through chamber 40. When the flow of water through chamber 40 ceased, the pressure in the cell would revert to ambient and in order to equalize pressures, water would be drawn into cell 20, even if the electrolyte in the cell was already at the level of end 42a of a displacement tube 42. Thus, repeated fluctuations of pressure differential due to the Venturi effect, could cause a gradual filling of cell 20 above the desired level (corresponding to the disposition of displacement tube lower end 42a). However, in any event, electrolyte in cell 20 cannot rise above the level of the watering conduit lower end 44a. Absent a rupture in the cell, the remaining air in cell 20 is trapped and cannot be displaced once the displacement tube lower end 42a and watering conduit lower end 44a are both submerged in the electrolyte. Thus, watering conduit lower end 44a can be disposed to define the safe upper limit of electrolyte level in cell 20.

Such Venturi effects are avoided, as noted above, by use of the relatively lower water flow rate and wide inlets, outlets and interconnecting tubing. Further, the use of a relatively large diameter watering cap, (e.g. on the order of 1.5 inches), further mitigates against the possibility of the generation Venturi effects by the water flow.

In addition, minimum pressure fluctuations at watering conduit upper end 44b, are insured by the relative positioning of inlet 36, outlet 38, air displacement tube 42 and watering conduit 44. Specifically, inlet 36 and outlet 38 are disposed in opposite sidewalls of body 30 along a given nominal radial line. As previously noted, air displacement tube 42 is suitably centrally disposed in base 32, and watering conduit 44 radially offset therefrom. As best seen from FIG. 2b, air displacement tube 42 and watering conduit 44 are disposed on a common nominal radial line disposed at approximately 90° to the common radial line of inlet 36 and outlet 38.

Figure 3:
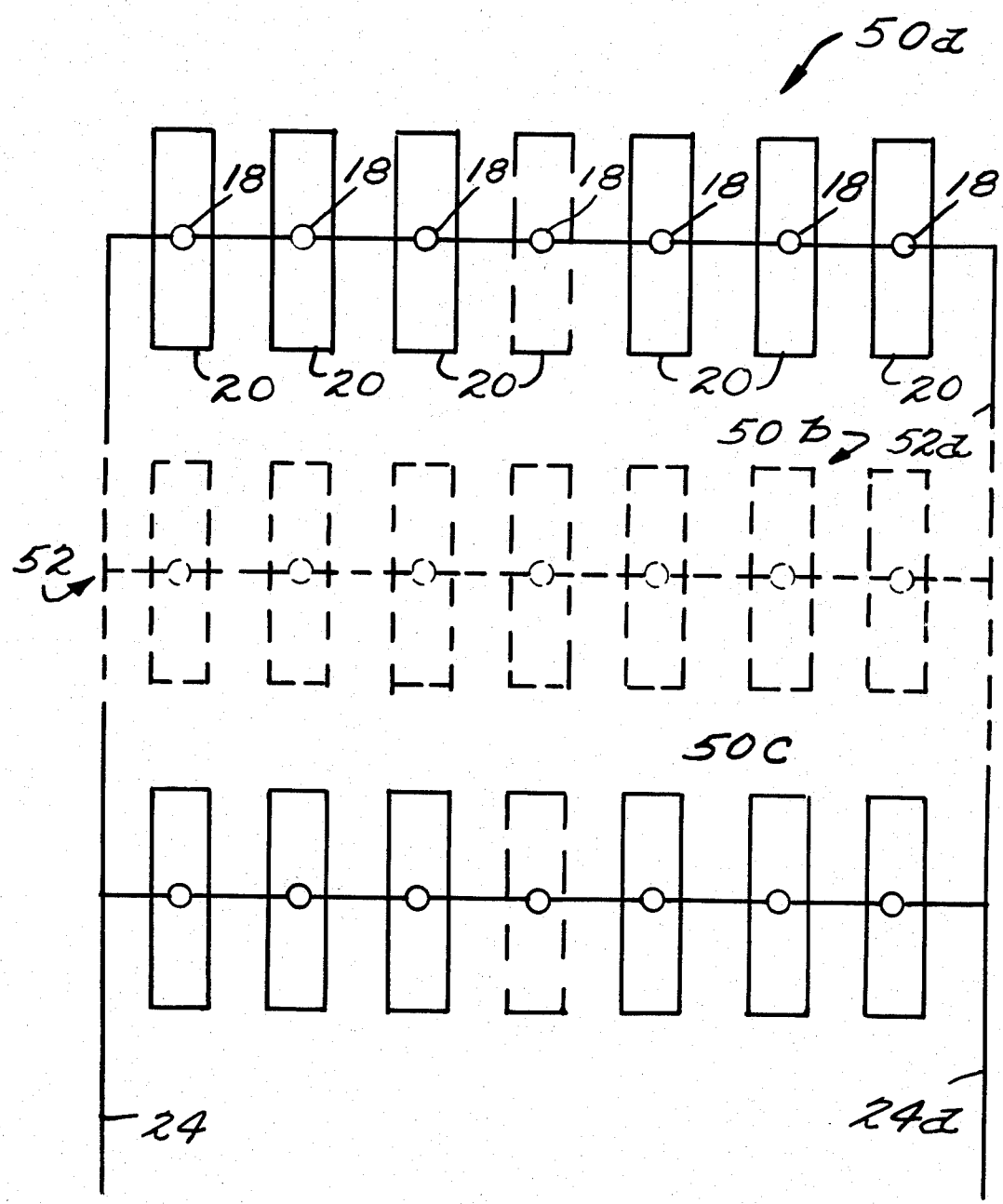
FIG. 3 is a schematic diagram showing parallel interconnection of a plurality of serial groups of cells.

If desired, a plurality of cells 20 can be connected in series-parallel configurations, such as shown in FIG. 3. Respective groups 50a, 50b, 50c . . . of a predetermined number of serially connected cells 20 are connected in parallel by suitable manifolds 52, 52a at the respective ends of the series groups. The manifolds are, in turn, coupled to tubing 24 and return leg 24a.

Referring again briefly to FIG. 1, a system 10 is particularly suitable for battery applications having low charge rates. Under such circumstances, a single pump 16 can safely facilitate both automatic watering and gas purging, and the system has the added advantage of providing switching between watering and gas purging operations by merely opening or closing a single stop cock mechanism. Further, automatic operation is easily implemented by utilizing a solenoid controlled stop cock 14, which, together with pump 16, is operated under the control of the vehicle battery charging system 28. Stop cock 14 can be opened to admit air into the system during the later stages of charging battery cells 20, to dilute and vent evolved hydrogen through flame trap 22, and, at the onset of battery discharge, stop cock 14 can again be shut to commence watering as described above.

However, in applications where high rates of charging occur, it is often necessary to provide a relatively fast air flow to decrease concentration of hydrogen within the lines below the inflammable concentration limit (4%), but at the same time provide a relatively low water flow rate, as noted above. Accordingly, in such applications, a separate air pump capable of higher pumping capacity, or a variable pressure pump is desirable.

For example, in a system having N battery cells connected in series, where the cells have been charging for a number of hours at a charging current I, the maximum rate R of hydrogen evolution is equal:

$$R = 0.00027 \, I \times N \text{ cubic feet/minute} \quad (1)$$

or, in metric terms, $$R = 0.00765 \, I \times N \text{ liters/minute} \quad (2)$$

In electric vehicle operations, lead acid batteries comprising 75 cells connected in series, operating with a charging current of 15 amperes are not atypical. In such a system, the hydrogen evolution rate can be as high as 8.6 liters/minute, necessitating an air flow rate of 25 × 8.6 liters/minute i.e., 215 liters/minute, to ensure that the hydrogen concentration in the air passing through the last cap in the series is maintained below the 4% limit for explosive mixture. Conversely, as noted above, the desired water flow rate is on the order of 1 milliliter–100 milliliters/per minute. Because of the wide disparity between the desired air and water flow rates, it is desirable to utilize, for example, a low current, diaphragm pump to establish water flow, and a separate higher capacity air pump. Such a system 10a is shown in FIG. 4.

Referring now to FIG. 4, system 10a is adapted for use in an electric vehicle having respective batteries 60a disposed in the rear and 60b disposed in the front of the vehicle. Water is retained in respective holding tanks (reservoirs 12A and 12B), similarly disposed in the rear and front of the vehicle. Holding tanks 12A and 12B are vented to the atmosphere through respective flame traps 22A and 22B. Holding tanks 12A and 12B are accessed for filling through respective filling lines 62A and 62B. Lines 62A and 62B are normally closed during the watering and gas purging operations. (Closure mechanisms not shown).

Respective low flow rate water pumps 16A and 16B communicate through appropriate tubing 64A and 64B with the lower portion of holding tanks 12A and 12B respectively. When water pumps 16A and 16B are activated, water is drawn from holding tanks 12A and 12B through tubing 64A and 64B and inlet tubing 66A and 66B to respective serially (or series-parallel) connected watering caps 18 associated with the individual cells of batteries 60A and 60B. Tanks 12A and 12B are disposed at elevations below battery caps 18 so that return conduits 68A and 68B slope downwards and gravity facilitates a return flow of water into tanks 12A and 12B. The cells in batteries 60A and 60B are filled to the desired level, and overflow is returned to tanks 12A and 12B through return conduits 68A and 68B, displaced air and gases are vented through flame traps 22A and 22B, in a manner similar to that described in conjunction with FIGS. 1, 2A and 2B.

Gas purging is accomplished utilizing a separate high capacity air pump 70 cooperating with an intake 72. Pump 70 and intake 72 are disposed at higher elevations than battery caps 18, to prevent water from entering pump 70 during the watering operation. During the watering operation, air pump 70 prevents air flow from inlet 72 into the system.

Gas purging is initiated by deactivating water pumps 16a and 16b and activating air pump 70. Accordingly, air is admitted into the system through inlet 72 and is applied under pressure to a "t" connector 74, whereat the air stream is split, through tubing 76, to rear battery 60A and, through tubing 78, to front battery 60B. Displaced gases from caps 18 are forced into holding tanks 12A and 12B and exhausted through flame traps 22A and 22B.

Water pumps 16A and 16B and air pump 70 can be selectively actuated in accordance with a voltage sensor and timer associated with the battery charging system (not shown). For example, air pump 70 may be switched on when the batteries reach a predetermined voltage limit during charging, at which point evolution of gases typically commences. Pump 70 would be maintained on for a predetermined period after the charger has been turned off, to insure gas purging until evolution of gases has substantially ceased. After air pump 70 has been turned off, water pumps 16A and 16B would be actuated to adjust the level of electrolyte in the respective battery cells. Water pumps 16A and 16B would remain activated for a sufficient time period to insure that the desired electrolyte level is attained in all of the cells.

It will be understood that while various of the conductor/connections are shown in the drawing as single lines, they are not so shown in a limiting sense and may comprise plural conductors/connections as is understood in the art. Further, the above description is of preferred exemplary embodiments of the present invention and the invention is not limited to the specific form shown. Modification may be made in the design and arrangements of the elements without departing from the spirit of the invention as expressed in the appended claims.

What is claimed is:

1. A watering system for a battery having at least one cell said system comprising:
an electrolyte reservoir;
at least one pump;
a respective watering cap associated with the watering aperture of each said cell;
a flame trap;
interconnecting means for selectively interconnecting said reservoir, said pump, each said respective watering cap, and said flame trap to form an essentially closed system;
said interconnecting means including gas purging means for selectively opening said closed system to the atmosphere, displacing electrolyte in said system outside of said cells with air and venting gases in said system through said flame trap;
each respective watering cap comprising:
a body, adapted for cooperation with said cell and including a hollow chamber,
an inlet and an outlet, communicating with said chamber and adapted for cooperation with said interconnecting means, said inlet and outlet having relatively large diameter;
an air displacement conduit having an upper portion extending into said chamber and a lower portion disposed to extend a predetermined distance into said cell, and
a watering conduit, communicating between said chamber and said cell, having a relatively small cross-sectional area.

2. The system of claim 1 wherein said flame trap is disposed to generate a reduced pressure in the portion of said interconnecting means returning electrolyte to said reservoir.

3. The system of claim 1 wherein said pump is disposed at an elevation higher than said reservoir and said gas purging means comprising:
a stop cock opening to the atmosphere coupled into said interconnecting means between said reservoir and said pump, at an elevation higher than said reservoir, whereby, when said stop cock is opened, said pump forces air through said system.

* * * * *